United States Patent [19]

Epstein et al.

[11] 4,252,873
[45] Feb. 24, 1981

[54] SEAL FOR ELECTROCHEMICAL CELL

[75] Inventors: James Epstein, Sharon; Nikola Marincic, Winchester, both of Mass.

[73] Assignee: Battery Engineering, Inc., Newton, Mass.

[21] Appl. No.: 61,745

[22] Filed: Jul. 30, 1979

[51] Int. Cl.$^3$ ............................................. H01M 2/02
[52] U.S. Cl. ...................................... 429/181; 429/185; 29/623.1
[58] Field of Search ............... 429/181, 182, 183, 184, 429/174; 29/623.1; 174/151, 152 R, 153 R

[56] References Cited

U.S. PATENT DOCUMENTS

| | | | |
|---|---|---|---|
| 2,926,210 | 2/1960 | Sturges | 429/181 |
| 3,427,205 | 2/1969 | Plitt et al. | 429/181 X |
| 3,652,340 | 3/1972 | Sharpe et al. | 429/184 |
| 3,678,178 | 7/1972 | Hubbauer et al. | 429/181 X |
| 4,048,392 | 9/1977 | Garoutte | 429/181 X |
| 4,166,158 | 8/1979 | Mead et al. | 429/181 |

*Primary Examiner*—Anthony Skapars
*Attorney, Agent, or Firm*—Robert A. Seldon

[57] ABSTRACT

A "ball and socket" seal arrangement for an electrochemical cell is disclosed wherein a ball of insulating material is captively retained in a socket formed by a portion of the cell cover in cooperation with a retaining member. The cell feedthrough passes through the socket and the insulating ball. After assembly of the components, the sockets are compressed, thereby forcing the insulator ball to conform to the inner surface of the socket to make an effective seal.

17 Claims, 4 Drawing Figures

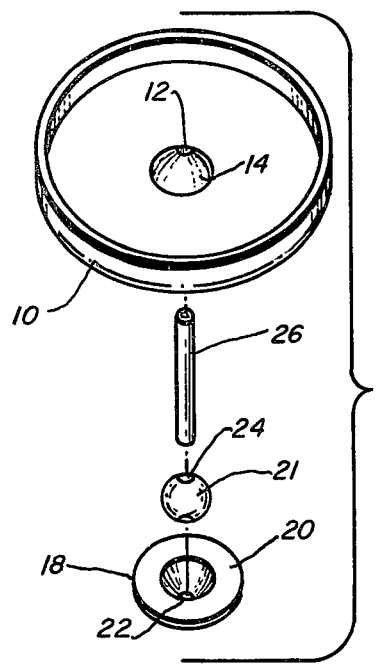
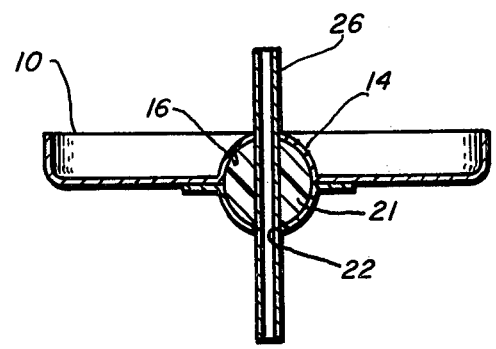
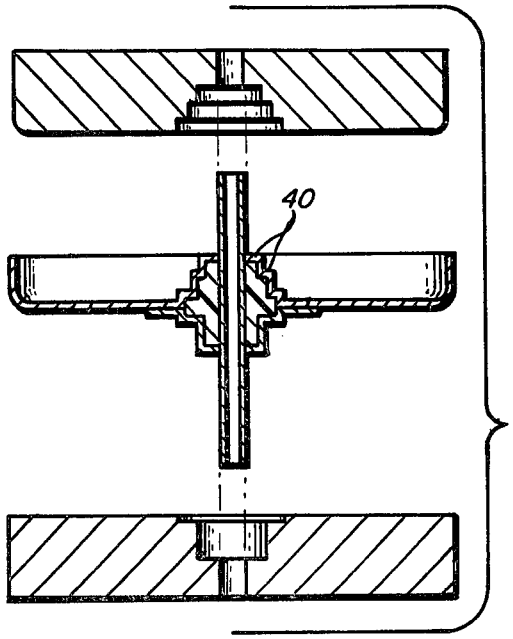
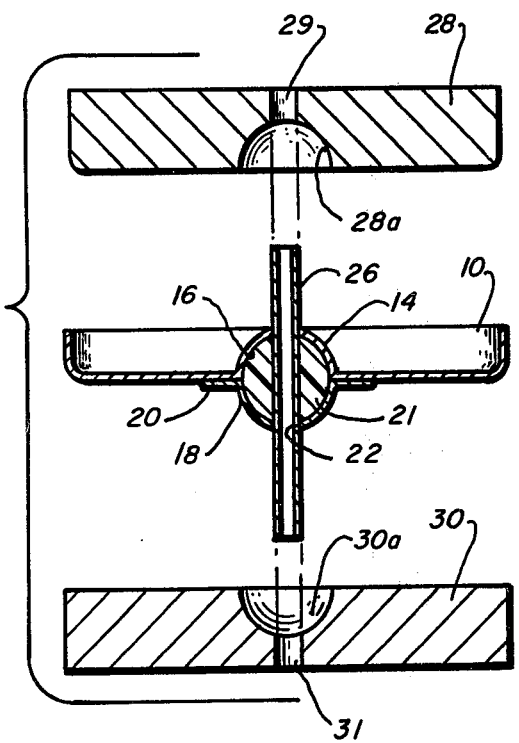

SEAL FOR ELECTROCHEMICAL CELL

BACKGROUND OF THE INVENTION

This invention relates to electrochemical cells and, more particularly, to a seal for such cells.

The sealing of a cell represents one of the most troublesome and complex manufacturing problems encountered by practitioners of the art. The problem is particularly acute when the internal cell components, such as lithium metal in certain batteries, are extremely chemically active and the seal is hermetic. Besides the theoretical cconsiderations involving the choice of materials, the practical balancing of economics and reliability have plagued the industry. The ideal seal is one which is inexpensive, easily assembled, and resistant to thermal and mechanical shocks.

The extent to which the industry has searched for such a seal may be best demonstrated by the quantity of literature directed to this one portion of the cell.

Conventionally, glass-to-metal seals and ceramic-to-metal seals have been used to hermetically seal electrochemical cells. In the glass-to-metal seal, an aperture is provided in the cover of a cell. A glass bead, having a metallic conductor extending centrally therethrough, is placed in the aperture so that the conductor, called a feedthrough, extends outwardly from both surfaces of the cover. The cover, bead, feedthrough are then fired at a temperature which melts the glass and fuses it at its outer periphery to the cover and internally to the feedthrough. Naturally, the heating of the assemblies to the high temperatures involved represents an expenditure of energy which adds to the expense of the assembly.

Glass-to-metal seals fall into two general types: matched and mismatched. In the matched seal, the glass and metal have the same coefficient of expansion and the glass is bonded to the metal through an oxide layer formed on the surface of the metal. Improper oxide formation adversely effects the integrity of the seal. In the mismatched seal, the glass is retained in the metal body by compressive forces generated by the differences in the coefficients of expansion of the glass and metal.

The ceramic-to-metal seal is generally similar to the glass-to-metal seal except that the ceramic is bonded to the metal by brazing rather than fusing.

While the above seals have been extensively used owing to the quality of the seal, they are expensive to manufacture and easily damaged by thermal and mechanical shocks.

A less expensive seal is disclosed in U.S. Pat. No. 3,109,055 which describes an internally threaded, relatively heavy walled, metallic sleeve which is disposed about an externally threaded, cylindrical, dielectric bushing. The bushing has an axial bore through which a conductor extends. The sleeve is circumferentially deformed along a portion of its length to radially compress the sleeve about the bushing and the bushing about the conductor as the bushing is screwed into the sleeve. The bushing is formed from polytrifluorochloroethylene a dielectric material having practically no molecular water or moisture permeability and which acccordingly is adapted to provide a vapor seal.

An object of the present invention is to provide a hermetic seal which is inexpensive, easy to assemble, resistant to thermal and mechanical shocks, and which occupies a minimal volume so that the volume of electrochemically active cell components can be maximized. As will become apparent, the seal, which we call a "ball and socket" seal need not necessarily be hermetic; by means of a simple material substitution, one may reduce the cost of the seal still further for applications in which hermetic sealing is unnecessary.

Generally, the seal is formed with a cover member having a through-hole. The surface of the cover which surrounds the through-hole forms one portion of a socket, hereinafter described. The remaining portion of the socket is provided by a retention member affixed to the cover. Interjacent the socket-defining surfaces is a member formed from an electrically insulative material which, for hermetic sealing, also possesses a low moisture permeability. The insulating member and retention member both have a through-hole which, together with the through-hole of the cover, accomodate a metallic conductor, or feedthrough. The holes of the cover and retention member are sized so that portions of the insulating member protrude therethrough.

Once the components of the seal have been assembled in the above manner, the socket volume is reduced by compressing the socket walls, forcing the insulating member to generally conform to the inner socket surface, and forming an effective seal.

Further details concerning our seal are discussed in the following Description of the Preferred Embodiment which includes the following Figures.

BRIEF DESCRIPTION OF THE DRAWINGS

FIG. 1 is an exploded perspective view of the components of a seal constructed in accordance with the invention.

FIG. 2 is a cross-sectional view of the seal of FIG. 1.

FIG. 3 is a cross-sectional view illustrating one way of compressing the socket of the seal.

FIG. 4 is a cross-sectional view showing a modification to the seal of FIG. 1.

DETAILED DESCRIPTION OF THE PREFERRED EMBODIMENT

FIG. 1 is an exploded perspective view of the components preferably forming our seal and is described in conjunction with FIG. 2, a cross-sectional view of the assembled components. One will appreciate that the seal may conveniently be formed as a sub-assembly of the cell. A cover 10, adapted to be sealed to the cell can about its outer periphery, is shown to have a central through-hole 12. The portion of the cover 10 surrounding the through-hole defines a portion of a socket and provides a convex surface 14 on the top side of the cover and a concave socket wall 16 on the lower cover side. The cover is easily formed by means of a stamping punch from metal approximately 0.025 inches thick. While the socket appears generally hemispherical, it will be understood that any number of different shapes are possible.

Affixed to the lower side of the cover 10 is a retaining member 18 whose generally concave interior defines the remaining portion of the socket. The retainer member 18 includes an annular flange 20, which is bonded to the underside of the cover by such means as welding, and a through-hole 22.

Both the cover 10 and retaining member 18 are fabricated from any material which is compatible with the particular electrochemical system of the cell. For example, stainless steel may be used for lithium/thionyl chloride cells known in the art while nickel plated steel may be used for alkaline cells.

Within the socket thus formed is a ball 21 of an electrically insulative material. In lithium/thionyl chloride cells, a fluoropolymer material is used. In order to form a hermetic seal, the material should additionally be one of low gas and moisture permeability. Examples of suitable materials are KEL-F, HALAR, and TEFZEL. (KEL-F is a trademark of 3M Company for polytrifluorochloroethylene. HALAR is a trademark of Allied Chemical for a co-polymer of ethylene and chlorotrifluoroethylene. TEFZEL is a trademark of DuPont for a co-polymer of ethylene and tetrafluoroethylene.)

In alkaline battery systems, the ball 21 may also be formed from Delrin, nylon, polyethylene or polypropylene.

The ball 21 includes a through-hole 24 which accomodates a metal feedthrough 26. As shown best in FIG. 2, the feedthrough 26 passes through the holes in the cover 10, ball 21 and retaining member 18 so as to provide electrical coupling from the exterior terminal of the battery to the electrodes in the housing. The function of feedthrough is well known in the art.

After pre-assembling the components heretofore described, the seal is effected by compressing the socket sufficiently to force the insulator ball to conform to the inner surface of the socket and to be swaged about the feedthrough. The compression step may be conveniently carried out, as shown in FIG. 3, by means of a pair of opposing dies 28, 30 having respective socket-contacting walls 28a, 30a which have relatively undersized diameters in comparison with the external diameter of the socket. The dies include through-holes 29, 31 so that they can fit over opposite ends of the feedthrough 26. The dies are accordingly brought together in any manner known in the art to effect the compression step. Because the ball is forced to conform to the surface irregularities of the socket, an effective hermetic seal is produced which occupies a small volume. The seal assembly thus formed may subsequently be incorporated into a battery assembly by coupling the feedthrough to electrodes and sealing the cover 10 to the battery case in any manner known in the art.

The advantages of the seal described herein include low material and fabrication costs, ease of assembly, and a small volume requirement. Further, the precise and critical steps heretofore associated with hermetic seals have been eliminated.

To further improve the effectiveness of the seal, grooves or, alternatively, rings are machined or otherwise formed on the feedthrough to increase its resistance to longitudinal forces, as well as the length of any leakage path between the insulative material and feedthrough. Because the compression of the socket forces the material to conform to the surface of the feedthrough, the modification adds no additional complexity to the described method.

FIG. 4 shows an additional modification to the seal wherein reinforcing rings 40 are formed on the socket during the compression step to increase the length of any leakage paths between the socket and material 12. Again, the modification adds no complexity to the described method; one may simply modify the shape of the die surface to produce the desired result.

While the foregoing description represents a preferred embodiment of the invention, it is appreciated that those skilled in the art will realize that other modifications and variations are obvious in light of the teachings herein. Accordingly, it is our intent that the invention be defined by the claims appended hereto and that these claims be given the broadest scope permitted by the prior art.

We claim:

1. A hermetically sealed battery comprising:
a case including a cover member sealed to the remaining case structure, the cover member including means defining a socket portion, the socket portion-defining means having a first through-hole;
a retention member affixed to the cover member in a cooperating position with respect to said socket portion-defining means so as to define a socket therewith, the retention member having a second through-hole;
an insulating member held within the socket, formed from electrically insulative material and conforming to the inner socket surface, the insulating member including a third through-hole aligned at its respective openings with openings of the first and second through-holes;
a pair of electrodes disposed within the case;
a feedthrough member electrically coupled to one of the electrodes and passing through the first, second and third through-holes to the exterior of the case, the feedthrough member compressingly held within the insulating member; and
an electrolyte.

2. The battery of claim 1 wherein at least one of the socket defining member is formed from a metal selected from the group consisting of stainless steel and nickel plated steel.

3. The battery of claim 1 wherein the insulating member is formed from a material selected from the group consisting of a fluoropolymer material, Delrin, nylon, polyethylene and polypropylene.

4. The battery of claim 1 wherein the insulating member is formed from polytrifluorochloroethylene.

5. The battery of claim 1 wherein the feedthrough member includes a plurality of circumferential grooves disposed along its length.

6. The battery of claim 1 wherein the feedthrough member includes a plurality of circumferential rings disposed along its length.

7. The battery of claim 1 wherein the interior of at least one of the socket defining members is formed as a plurality of peripheral rings.

8. For use with a battery, a seal assembly comprising:
a cover member;
a retention member affixed to the cover member and cooperatively defining a socket therewith, the socket having a pair of generally opposing through-holes;
an insulator member of electrically insulative material having low moisture permeability, the insulator member being contained within the socket and conforming to the shape thereof;
a feedthrough member passing through the insulating member and the through-holes of the socket.

9. The seal assembly of claim 8 wherein the cover member is formed from a metal selected from the group consisting of stainless steel and nickel plated steel.

10. The seal assembly of claim 8 wherein the insulating member is formed from a material selected from the group consisting of a fluoropolymer material, Delrin, nylon, polyethylene and polypropylene.

11. The seal assembly of claim 8 wherein the insulating member is formed from polytrifluorochloroethylene.

12. The seal assembly of claim 8 wherein the feedthrough member includes a plurality of circumferential grooves disposed along its length.

13. The seal assembly of claim 8 wherein the feedthrough member includes a plurality of circumferential rings disposed along its length.

14. The seal assembly of claim 8 wherein the interior of at least one of the socket defining members is formed as a plurality of peripheral rings.

15. A method for forming a hermetically sealed battery including the steps of:
   forming a socket between the cover of the battery and a member fastened thereto so as to capture a quantity of electrically insulative material within the socket;
   inserting a feedthrough through the insulating material and the socket; and
   compressing the socket so that the insulating material conforms to the inner surface of the socket.

16. The method of claim 15 including the step of compressing the socket by means of two opposed dies.

17. A battery formed by the method of claim 15.